(12) United States Patent
Fong et al.

(10) Patent No.: US 6,946,775 B2
(45) Date of Patent: Sep. 20, 2005

(54) METHOD AND STRUCTURE FOR A SLUG ASSISTED LONGITUDINAL PIEZOELECTRICALLY ACTUATED LIQUID METAL OPTICAL SWITCH

(75) Inventors: Arthur Fong, Colorado Springs, CO (US); Marvin Glenn Wong, Woodland Park, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 172 days.

(21) Appl. No.: 10/412,916

(22) Filed: Apr. 14, 2003

(65) Prior Publication Data

US 2004/0201312 A1 Oct. 14, 2004

(51) Int. Cl.$^7$ .................. H01H 19/00; H01H 57/00; H01L 41/08
(52) U.S. Cl. .................. 310/328; 310/323.17; 385/9; 385/147; 200/182; 200/187; 200/188; 200/214
(58) Field of Search .................. 200/182, 187–189, 200/211, 212, 214; 385/9, 147; 310/323.17, 328

(56) References Cited

U.S. PATENT DOCUMENTS

| | | | |
|---|---|---|---|
| 6,323,447 B1 | 11/2001 | Kondoh | |
| 6,373,356 B1 | 4/2002 | Gutierrez | |
| 6,512,322 B1 | 1/2003 | Wong | |
| 6,515,404 B1 | 2/2003 | Wong | |
| 6,621,957 B1 * | 9/2003 | Sullivan et al. | 385/37 |
| 6,765,161 B1 * | 7/2004 | Wong et al. | 200/182 |
| 6,768,068 B1 * | 7/2004 | Wong et al. | 200/182 |
| 2003/0207102 A1 * | 11/2003 | Fong et al. | 310/328 |
| 2004/0201310 A1 * | 10/2004 | Wong et al. | 310/328 |
| 2004/0201317 A1 * | 10/2004 | Wong | 310/328 |
| 2004/0201329 A1 * | 10/2004 | Wong et al. | 310/365 |
| 2004/0201330 A1 * | 10/2004 | Fong et al. | 310/365 |

FOREIGN PATENT DOCUMENTS

| | | |
|---|---|---|
| EP | 0593836 A1 | 10/1992 |
| FR | 2418539 A | 9/1979 |
| FR | 2458138 A1 | 10/1980 |
| FR | 2667396 | 9/1990 |
| JP | SHO 36-18575 | 10/1961 |
| JP | SHO 47-21645 | 10/1972 |
| JP | 63-276838 | 5/1987 |
| JP | 01-294317 | 5/1988 |
| JP | 08-125487 A | 5/1996 |
| JP | 9161640 A | 6/1997 |
| WO | WO 99/46624 A1 | 9/1999 |

OTHER PUBLICATIONS

Bhedwar, Homi C. et al., "Ceramic Multilayer Package Fabrication." Electronic Materials Handbook, Nov. 1989, pp. 460–469, vol. 1 Packaging, Section 4: Packages.

"Integral Power Resistors for Aluminum Substrate." IBM Technical Disclosure Bulletin, Jun. 1984, US, Jun. 1, 1984, p. 827, vol. 27, No. 1B, TDB–ACC–NO: NB8406827, Cross Reference: 0018–8689–27–1B–827.

Kim, Joonwon et al., "A Micromechanical Switch with Electrostatically Driven Liquid–Metal Droplet." Sensors and Actuators, A: Physical. v. 9798, Apr. 1, 2002, 4 pages.

Jonathan Simon, "A Liquid–Filled Microrelay With A Moving Mercury Microdrop" (Sep., 1997) Journal of Microelectromechanical Systems, vol. 6, No. 3, PP 208–216.

Marvin Glenn Wong, "A Piezoelectrically Actuated Liquid Metal Switch", May 2, 2002, patent application (pending), 12 pages of specification, 5 pages of claims, 1 page of abstract, and 10 sheets of drawings (Fig. 1–10).

* cited by examiner

Primary Examiner—Thomas M. Dougherty

(57) ABSTRACT

A method and structure for an optical switch. A channel is housed within a solid material. Contacts coupled to the channel are further coupled to the solid material, while a plurality of piezoelectric elements are coupled to chamber and further coupled to a slug. Optical waveguides are coupled to the channel. The contacts are coupled to a plurality of liquid metal globules, wherein one or more of the plurality of liquid metal globules are coupled to a slug. One or more piezoelectric elements are actuated, causing the slug to be moved within the channel. The motion of the slug is operable to block or unblock one or more of the plurality of optical waveguides.

37 Claims, 8 Drawing Sheets

METHOD AND STRUCTURE FOR A SLUG ASSISTED LONGITUDINAL PIEZOELECTRICALLY ACTUATED LIQUID METAL OPTICAL SWITCH

CROSS REFERENCE TO RELATED APPLICATIONS

This application is related to the following co-pending U.S. Patent Applications, being identified by the below enumerated identifiers and arranged in alphanumerical order, which have the same ownership as the present application and to that extent are related to the present application and which are hereby incorporated by reference:

Application 10010448-1, titled "Piezoelectrically Actuated Liquid Metal Switch", filed May 2, 2002 and identified by Ser. No. 10/137,691;

Application 10010529-1, "Bending Mode Latching Relay", and having the same filing date as the present application;

Application 10010531-1, "High Frequency Bending Mode Latching Relay", and having the same filing date as the present application;

Application 10010570-1, titled "Piezoelectrically Actuated Liquid Metal Switch", filed May 2, 2002 and identified by Ser. No. 10/142,076;

Application 10010571-1, "High-frequency, Liquid Metal, Latching Relay with Face Contact", and having the same filing date as the present application;

Application 10010572-1, "Liquid Metal, Latching Relay with Face Contact", and having the same filing date as the present application;

Application 10010573-1, "Insertion Type Liquid Metal Latching Relay", and having the same filing date as the present application;

Application 10010617-1, "High-frequency, Liquid Metal, Latching Relay Array", and having the same filing date as the present application;

Application 10010618-1, "Insertion Type Liquid Metal Latching Relay Array", and having the same filing date as the present application;

Application 10010634-1, "Liquid Metal Optical Relay", and having the same filing date as the present application;

Application 10010640-1, titled "A Longitudinal Piezoelectric Optical Latching Relay", filed Oct. 31, 2001 and identified by Ser. No. 09/999,590;

Application 10010643-1, "Shear Mode Liquid Metal Switch", and having the same filing date as the present application;

Application 10010644-1, "Bending Mode Liquid Metal Switch", and having the same filing date as the present application;

Application 10010656-1, titled "A Longitudinal Mode Optical Latching Relay", and having the same filing date as the present application;

Application 10010663-1, "Method and Structure for a Pusher-Mode Piezoelectrically Actuated Liquid Metal Switch", and having the same filing date as the present application;

Application 10010664-1, "Method and Structure for a Pusher-Mode Piezoelectrically Actuated Liquid Metal Optical Switch", and having the same filing date as the present application;

Application 10010790-1, titled "Switch and Production Thereof", filed Dec. 12, 2002 and identified by Ser. No. 10/317,597;

Application 10011055-1, "High Frequency Latching Relay with Bending Switch Bar", and having the same filing date as the present application;

Application 10011056-1, "Latching Relay with Switch Bar", and having the same filing date as the present application;

Application 10011064-1, "High Frequency Push-mode Latching Relay", and having the same filing date as the present application;

Application 10011065-1, "Push-mode Latching Relay", and having the same filing date as the present application;

Application 10011121-1, "Closed Loop Piezoelectric Pump", and having the same filing date as the present application;

Application 10011329-1, titled "Solid Slug Longitudinal Piezoelectric Latching Relay", filed May 2, 2002 and identified by Ser. No. 10/137,692;

Application 10011344-1, "Method and Structure for a Slug Pusher-Mode Piezoelectrically Actuated Liquid Metal Switch", and having the same filing date as the present application;

Application 10011397-1, "Method and Structure for a Slug Assisted Pusher-Mode Piezoelectrically Actuated Liquid Metal Optical Switch", and having the same filing date as the present application;

Application 10011398-1, "Polymeric Liquid Metal Switch", and having the same filing date as the present application;

Application 10011410-1, "Polymeric Liquid Metal Optical Switch", and having the same filing date as the present application;

Application 10011436-1, "Longitudinal Electromagnetic Latching Optical Relay", and having the same filing date as the present application;

Application 10011437-1, "Longitudinal Electromagnetic Latching Relay", and having the same filing date as the present application;

Application 10011458-1, "Damped Longitudinal Mode Optical Latching Relay", and having the same filing date as the present application;

Application 10011459-1, "Damped Longitudinal Mode Latching Relay", and having the same filing date as the present application;

Application 10020013-1, titled "Switch and Method for Producing the Same", filed Dec. 12, 2002 and identified by Ser. No. 10/317,963;

Application 10020027-1, titled "Piezoelectric Optical Relay", filed Mar. 28, 2002 and identified by Ser. No. 10/109,309;

Application 10020071-1, titled "Electrically Isolated Liquid Metal Micro-Switches for Integrally Shielded Microcircuits", filed Oct. 8, 2002 and identified by Ser. No. 10/266,872;

Application 10020073-1, titled "Piezoelectric Optical Demultiplexing Switch", filed Apr. 10, 2002 and identified by Ser. No. 10/119,503;

Application 10020162-1, titled "Volume Adjustment Apparatus and Method for Use", filed Dec. 12, 2002 and identified by Ser. No. 10/317,293;

Application 10020241-1, "Method and Apparatus for Maintaining a Liquid Metal Switch in a Ready-to-Switch Condition", and having the same filing date as the present application;

Application 10020242-1, titled "A Longitudinal Mode Solid Slug Optical Latching Relay", and having the same filing date as the present application;

Application 10020473-1, titled "Reflecting Wedge Optical Wavelength Multiplexer/Demultiplexer", and having the same filing date as the present application;

Application 10020540-1, "Method and Structure for a Solid Slug Caterpillar Piezoelectric Relay", and having the same filing date as the present application;

Application 10020541-1, titled "Method and Structure for a Solid Slug Caterpillar Piezoelectric Optical Relay", and having the same filing date as the present application;

Application 10030438-1, "Inserting-finger Liquid Metal Relay", and having the same filing date as the present application;

Application 10030440-1, "Wetting Finger Liquid Metal Latching Relay", and having the same filing date as the present application;

Application 10030521-1, "Pressure Actuated Optical Latching Relay", and having the same filing date as the present application;

Application 10030522-1, "Pressure Actuated Solid Slug Optical Latching Relay", and having the same filing date as the present application; and Application 10030546-1, "Method and Structure for a Slug Caterpillar Piezoelectric Reflective Optical Relay", and having the same filing date as the present application.

TECHNICAL FIELD

This invention relates generally to the field of electronic devices and systems, and more specifically to optical switching technology.

BACKGROUND

A relay or switch may be used to change an optical signal from a first state to a second state. In general there may be more than two states. In applications that require a small switch geometry or a large number of switches within a small region, microelectronic fabrication techniques may be used to create switches with a small footprint. A semiconductor switch may be used in a variety of applications, such as industrial equipment, telecommunications equipment and control of electro-mechanical devices such as ink jet printers.

In switching applications, the use of piezoelectric technology may be used to actuate a switch. Piezoelectric materials have several unique characteristics. A piezoelectric material can be made to expand or contract in response to an applied voltage. This is known as the indirect piezoelectric effect. The amount of expansion or contraction, the force generated by the expansion or contraction, and the amount of time between successive contractions are important material properties that influence the selection of a piezoelectric material in a particular application. Piezoelectric material also exhibits a direct piezoelectric effect, in which an electric field is generated in response to an applied force. This electric field may be converted to a voltage if contacts are properly coupled to the piezoelectric material. The indirect piezoelectric effect is useful in making or breaking a contact within a switching element, while the direct piezoelectric effect is useful in generating a switching signal in response to an applied force.

SUMMARY

A method and structure for an optical switch is disclosed. According to the structure of the present invention, a channel coupled to a plurality of optical waveguides is housed within a solid material. Contacts within the channel are coupled to the solid material, while piezoelectric elements coupled to the channel are coupled to a slug. Liquid metal within the channel is coupled to the slug and coupled to the contacts. According to the method of the present invention, piezoelectric elements are actuated, causing the slug to be moved within the channel. The movement of the slug blocks or unblocks one or more optical waveguides.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
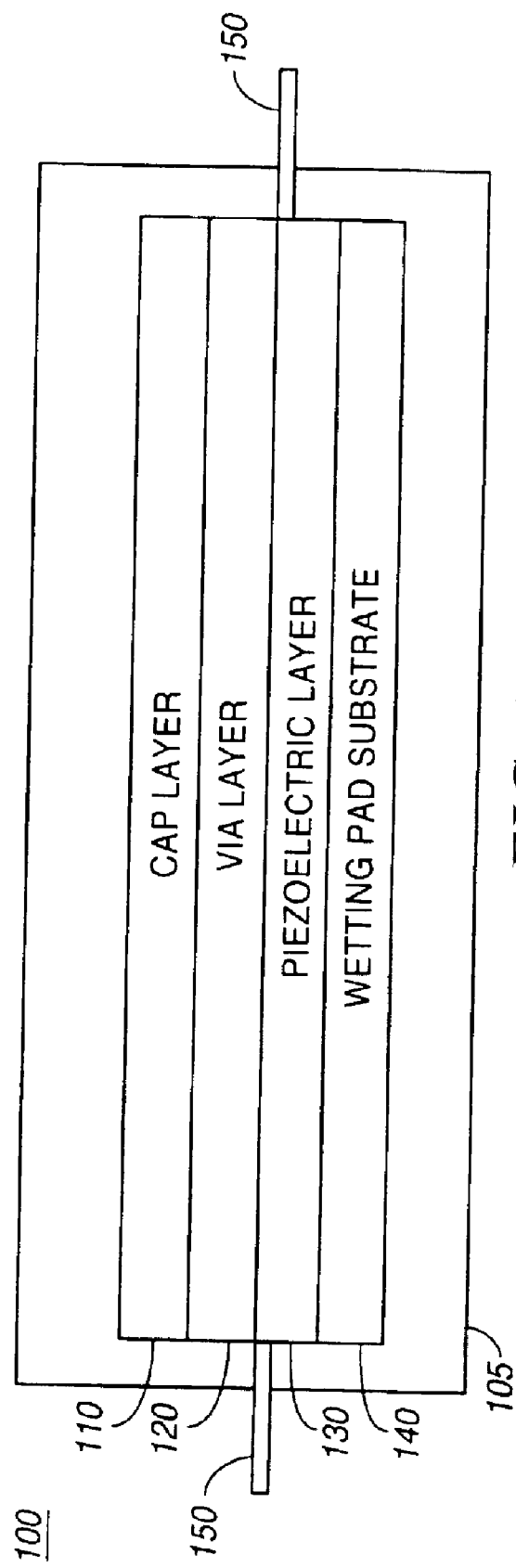
FIG. 1 is a side view of a slug assisted longitudinal liquid metal optical switch, according to certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

A liquid metal switch may be represented using a plurality of layers, wherein the plurality of layers represent layers created during a fabrication of the liquid metal switch.

Referring now to FIG. 1 a side view 100 of a slug assisted longitudinal liquid metal optical switch 105 is shown, according to certain embodiments of the present invention. Slug assisted longitudinal liquid metal optical switch 105 comprises a top cap layer 110, via layer 120, piezoelectric layer 130, wetting pad substrate layer 140, and optical waveguide 150. In certain embodiments of the present invention, cap layer 110 is coupled to via layer 120, via layer 120 is coupled to piezoelectric layer 130, piezoelectric layer 130 is coupled to wetting pad substrate layer 140, and plurality of optical waveguides 150 is coupled to one or more of via layer 120 and piezoelectric layer 130. It is noted that wetting pad substrate layer 150 may further comprise a plurality of circuit traces, wherein the plurality of circuit traces are not shown in FIG. 1. It is noted that one or more of the layers shown in FIG. 1 may be combined without departing from the spirit and scope of the present invention. In certain embodiments of the present invention, the cap layer 110, via layer 120, piezoelectric layer 130, and wetting pad substrate layer 140 may be composed of one or more of glass, ceramic, composite material and ceramic-coated material.

Figure 2:
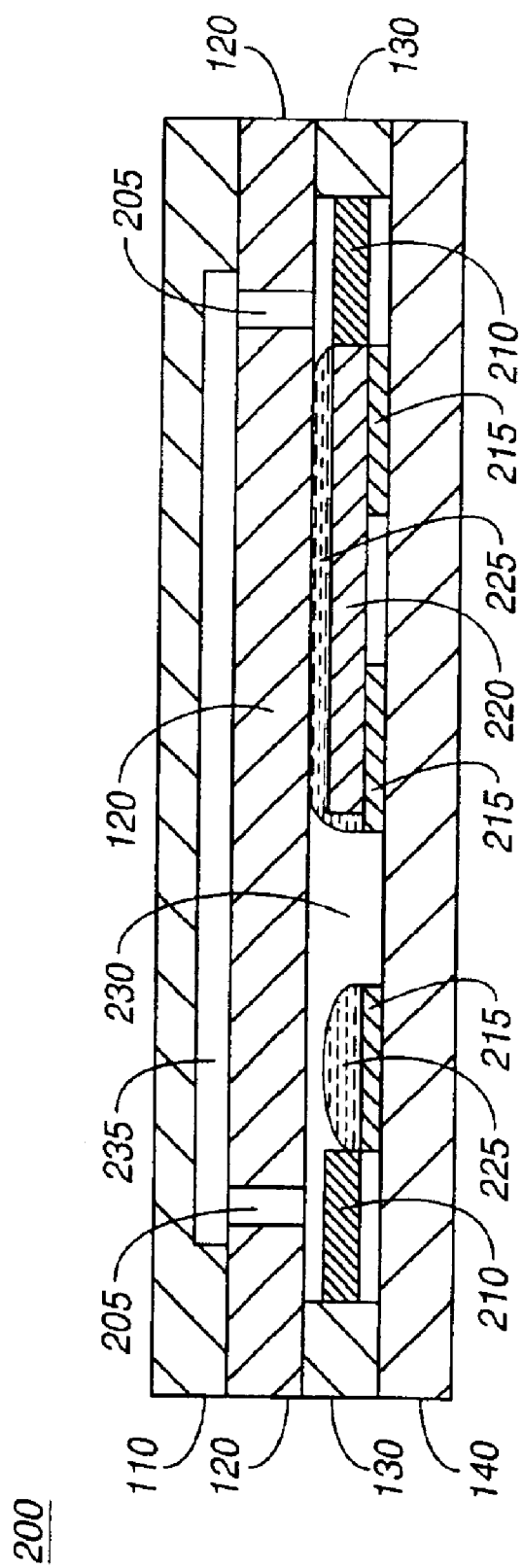
FIG. 2 is a sectional drawing end view of a slug assisted longitudinal liquid metal optical switch, according to certain embodiments of the present invention.

Referring now to FIG. 2 a sectional drawing end view 200 of slug assisted longitudinal liquid metal optical switch 105 is shown, according to certain embodiments of the present invention. The sectional drawing end view 200 illustrates how a slug 220 moves within a channel 230 under an applied force of piezoelectric elements 210. Piezoelectric elements 210 are coupled to piezoelectric layer 130, and slug 220 is coupled to the piezoelectric elements 210, coupled to liquid metal 225 and coupled to one or more of a plurality of contacts 215. The liquid metal 225, such as mercury or a Gallium alloy, acts as a friction-reducing lubricant. Plurality of contacts are coupled to wetting pad substrate layer 140. In certain embodiments of the present invention, slug 220 is coupled to two of the plurality of contacts 215. Slug 220 may be solid or hollow, and may be composed of a wettable material, such as metallic compounds, ceramic or plastic. Liquid metal 225 is coupled to slug 220 and the plurality of contacts 215. In certain embodiments of the present invention, slug 220 and plurality of contacts 215 are wettable. The channel 230 further comprises an inert gas that is operable to fill the portions of the channel 230 not occupied by plurality of contacts 215, slug 220, and piezoelectric elements 210.

In certain embodiments of the present invention, channel 230 lies within piezoelectric layer 130 and channel layer 230 is further coupled to via layer 120 and wetting pad substrate layer 140. Plurality of optical waveguides 150 are coupled to channel 230 along an axis perpendicular to a long axis of channel 230. The piezoelectric elements 210 are oriented so that a direction of extension of piezoelectric elements is aligned with a long axis of slug 220. A plurality of vias 205 are further coupled to channel 230, wherein said plurality of vias 205 are located in the via layer 120. In certain embodiments of the present invention, plurality of vias are oriented in the via layer 120 directly above the corresponding plurality of piezoelectric elements 210. Plurality of vias 205 are further coupled to an upper channel 235. Upper channel 235 is operable to equalize a pressure of the inert gas of the channel 230. In certain embodiments of the present invention, upper channel 235 is located within cap layer 110.

Figure 3:
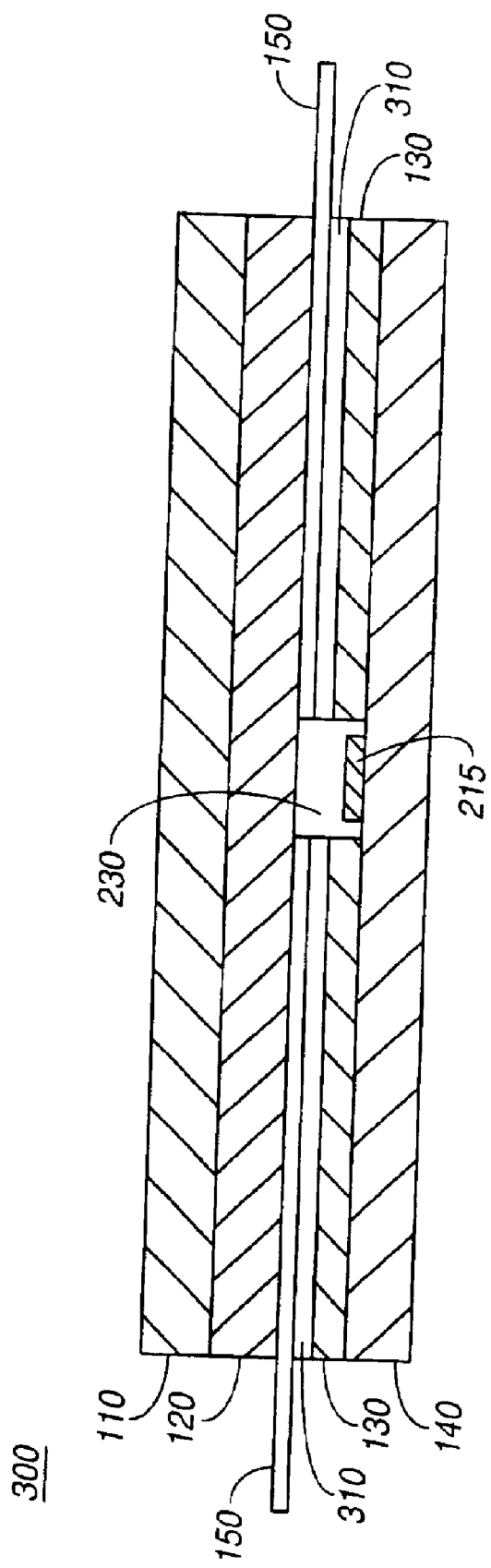
FIG. 3 is a sectional drawing side view of a slug assisted longitudinal liquid metal optical switch, according to certain embodiments of the present invention.

Referring now to FIG. 3 a sectional drawing side view 300 of slug assisted longitudinal liquid metal optical switch 105 is shown, according to certain embodiments of the present invention. The sectional drawing side view 300 of FIG. 3 has an orientation that is 90 degrees rotated with respect to the sectional drawing end view 200. The plurality of optical waveguides 150 are further coupled to an encapsulant 310, wherein said encapsulant is further coupled to piezoelectric layer 130. In certain embodiments of the present invention, encapsulant 310 is composed of an inert, mechanically stable, quick-setting adhesive such as a UV curable epoxy or acrylic.

Figure 4:
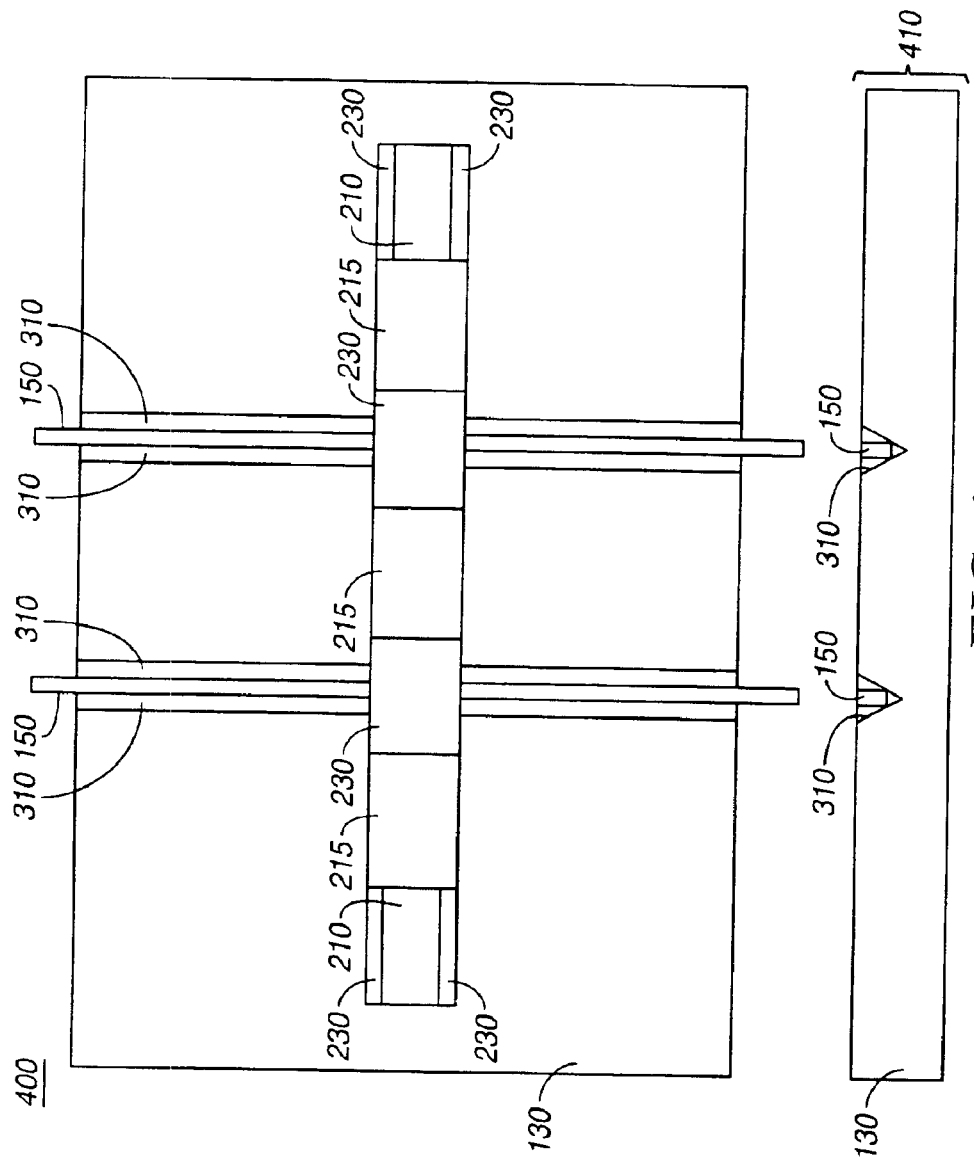
FIG. 4 is a top view of a piezoelectric substrate layer of a slug assisted longitudinal liquid metal optical switch with cap layer and via layer removed, according to certain embodiments of the present invention.

Referring now to FIG. 4 a top view 400 of piezoelectric substrate layer 130 of slug assisted longitudinal liquid metal optical switch 105 with cap layer 110 and via layer 120 removed is shown, according to certain embodiments of the present invention. The top view 400 illustrates that plurality of optical waveguides 150 are placed with respect to plurality of contacts 215 so that an optical waveguide of plurality of optical waveguides 150 passes between two contacts of plurality of contacts 215. Although only two optical waveguides and three contacts are illustrated in FIG. 4, it is noted that a greater or fewer number of optical waveguides and a greater or fewer number of contacts could be present in slug assisted longitudinal liquid metal optical switch 105 without departing from the spirit and scope of the present invention. Although it is not shown in FIG. 4, it will be evident to one of skill in the art that plurality of piezoelectric elements 210 are coupled to a corresponding plurality of actuating contacts, wherein the plurality of actuating contacts are operable to control actuation of the plurality of piezoelectric elements 210.

FIG. 4 further illustrates a side view 410 of the top view 400. The side view 410 illustrates how the encapsulant 310 and plurality of optical waveguides 150 are coupled to piezoelectric layer 130. In certain embodiments of the present invention, encapsulant 310 and plurality of optical waveguides 150 are placed in a V-shaped groove of piezoelectric layer 130

Figure 5:
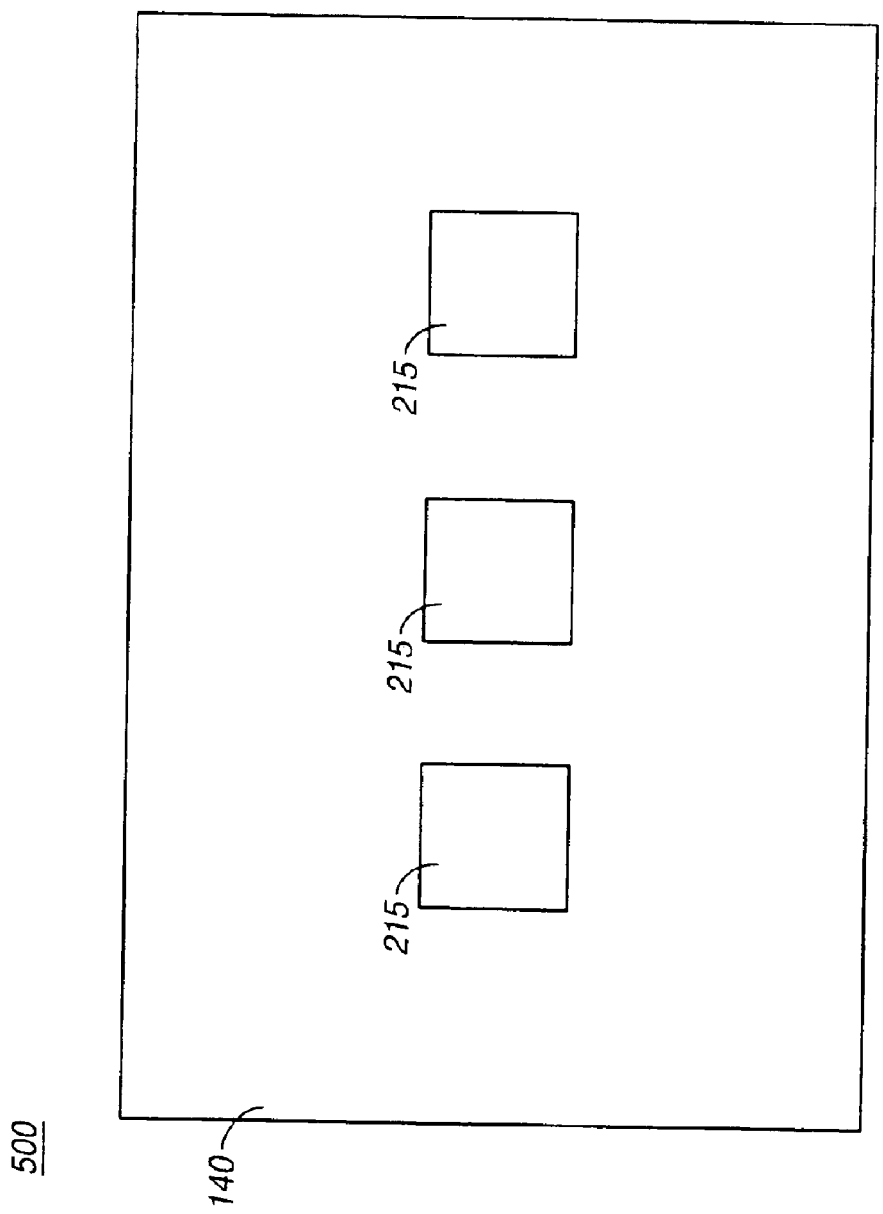
FIG. 5 is a top view of a substrate layer of a slug assisted longitudinal liquid metal optical switch, according to certain embodiments of the present invention.

Referring now to FIG. 5 a top view 500 of wetting pad substrate layer 140 of slug assisted longitudinal liquid metal optical switch 105 is shown, according to certain embodiments of the present invention. FIG. 5 illustrates a potential placement of the coupling of plurality of contacts 215 to wetting pad substrate layer 140. It is noted that although the plurality of contacts 215 are shown as square, other geometries could be used without departing from the spirit and scope of the present invention. In certain embodiments of the present invention, plurality of contacts 215 are equally spaced relative to wetting pad substrate layer 140.

Figure 6:
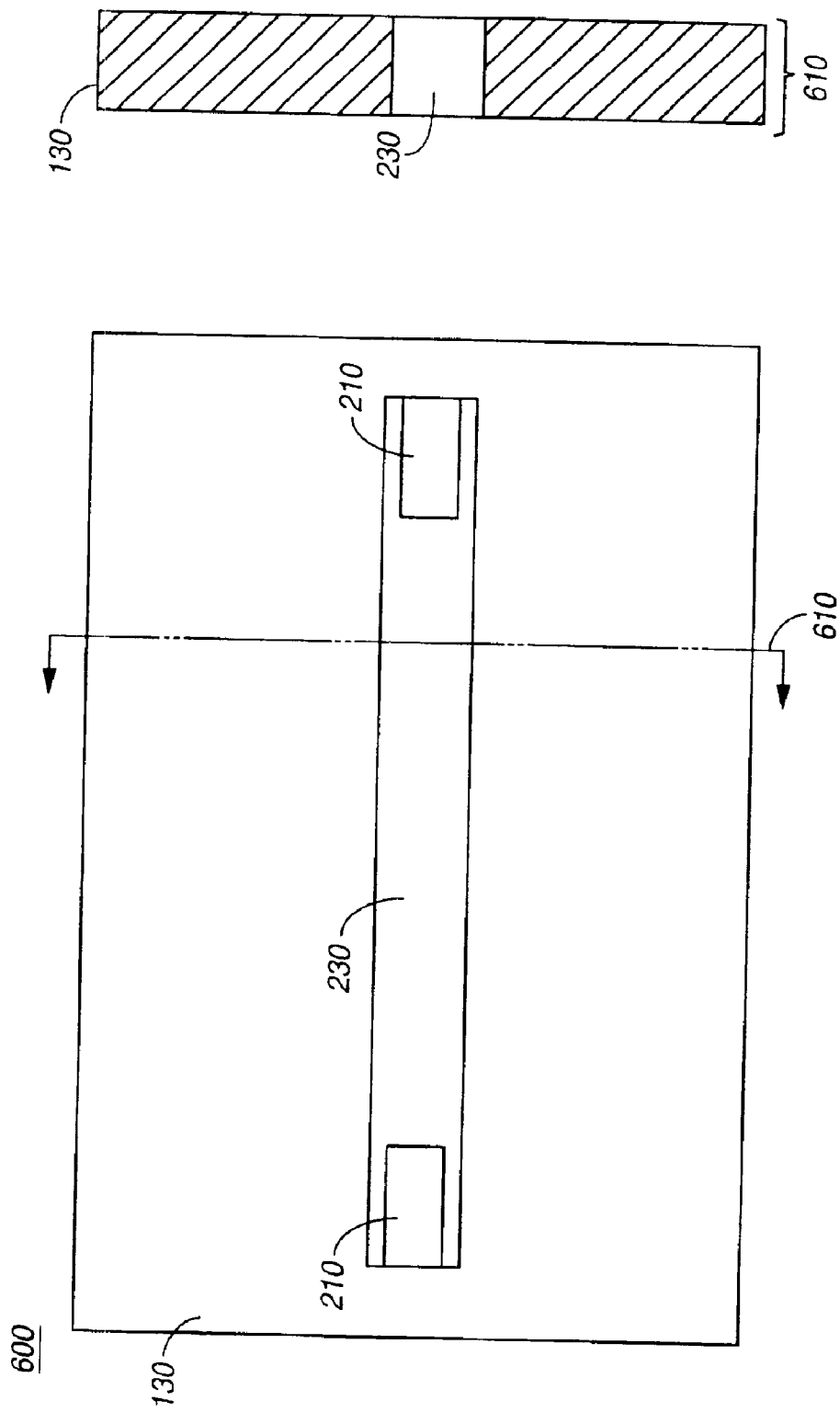
FIG. 6 is a top view of a piezoelectric layer of a slug assisted longitudinal liquid metal optical switch, according to certain embodiments of the present invention.

Referring now to FIG. 6 a top view 600 of piezoelectric layer 130 of a slug assisted longitudinal liquid metal optical switch 105 is shown, according to certain embodiments of the present invention. The top view 600 illustrates an orientation of channel 230 and plurality of piezoelectric elements 210 relative to piezoelectric layer 130. In certain embodiments of the present invention, channel 230 is centered within piezoelectric layer 130 when piezoelectric layer 130 is viewed using the top view 600. A cross-section 610 of top view 600 is also shown in FIG. 6. The cross-section 610 further illustrates a placement of channel 230 relative to piezoelectric layer 130.

Figure 7:
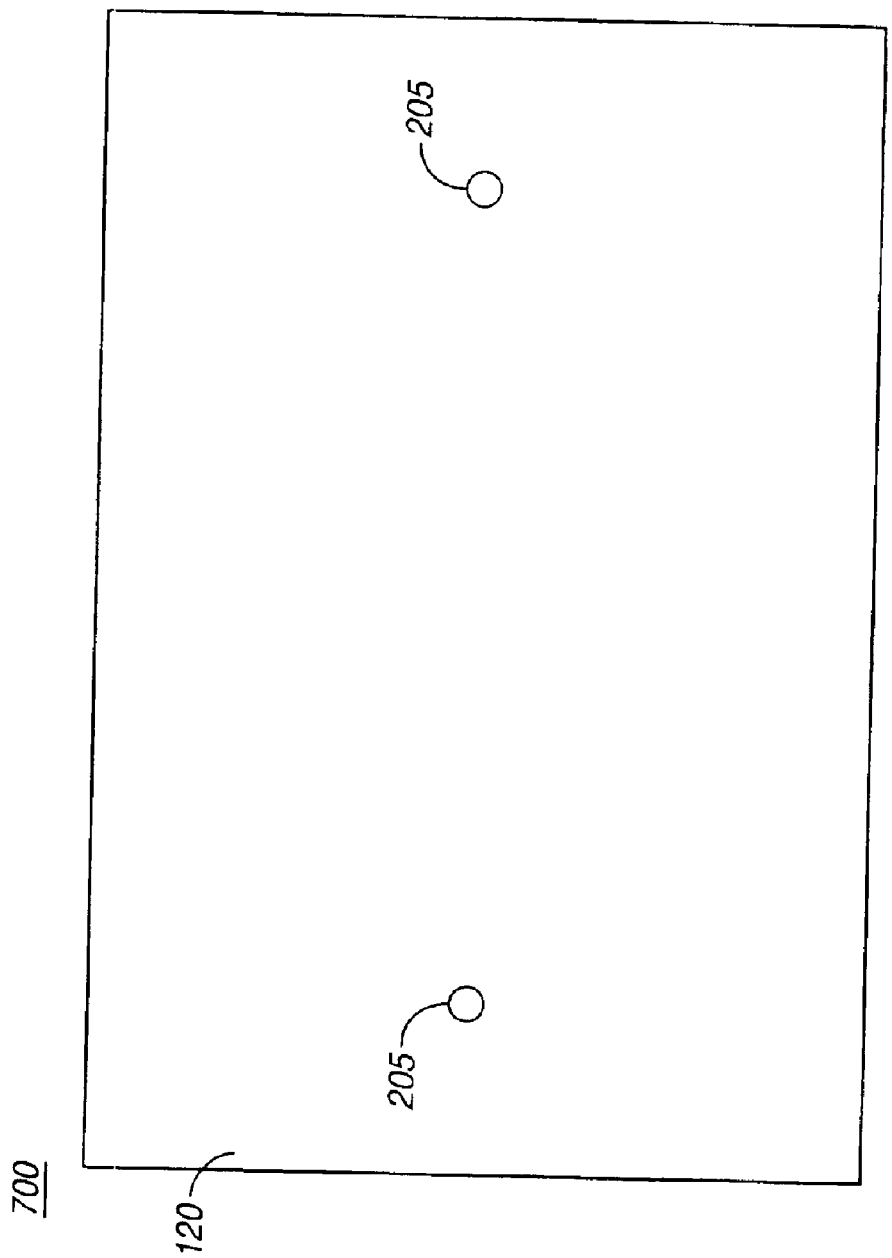
FIG. 7 is a top view of a via layer of a slug assisted longitudinal liquid metal optical switch, according to certain embodiments of the present invention.

Referring now to FIG. 7 a top view 700 of via layer 120 of slug assisted longitudinal liquid metal optical switch 105 is shown, according to certain embodiments of the present invention. Top view 700 illustrates a location of plurality of vias 205 relative to a shape of via layer 120. It is noted that although plurality of vias 205 are represented in FIG. 7 as having a circular cross-section, other types of cross section geometries are possible, for example square cross-sections, without departing from the spirit and scope of the present invention.

Figure 8:
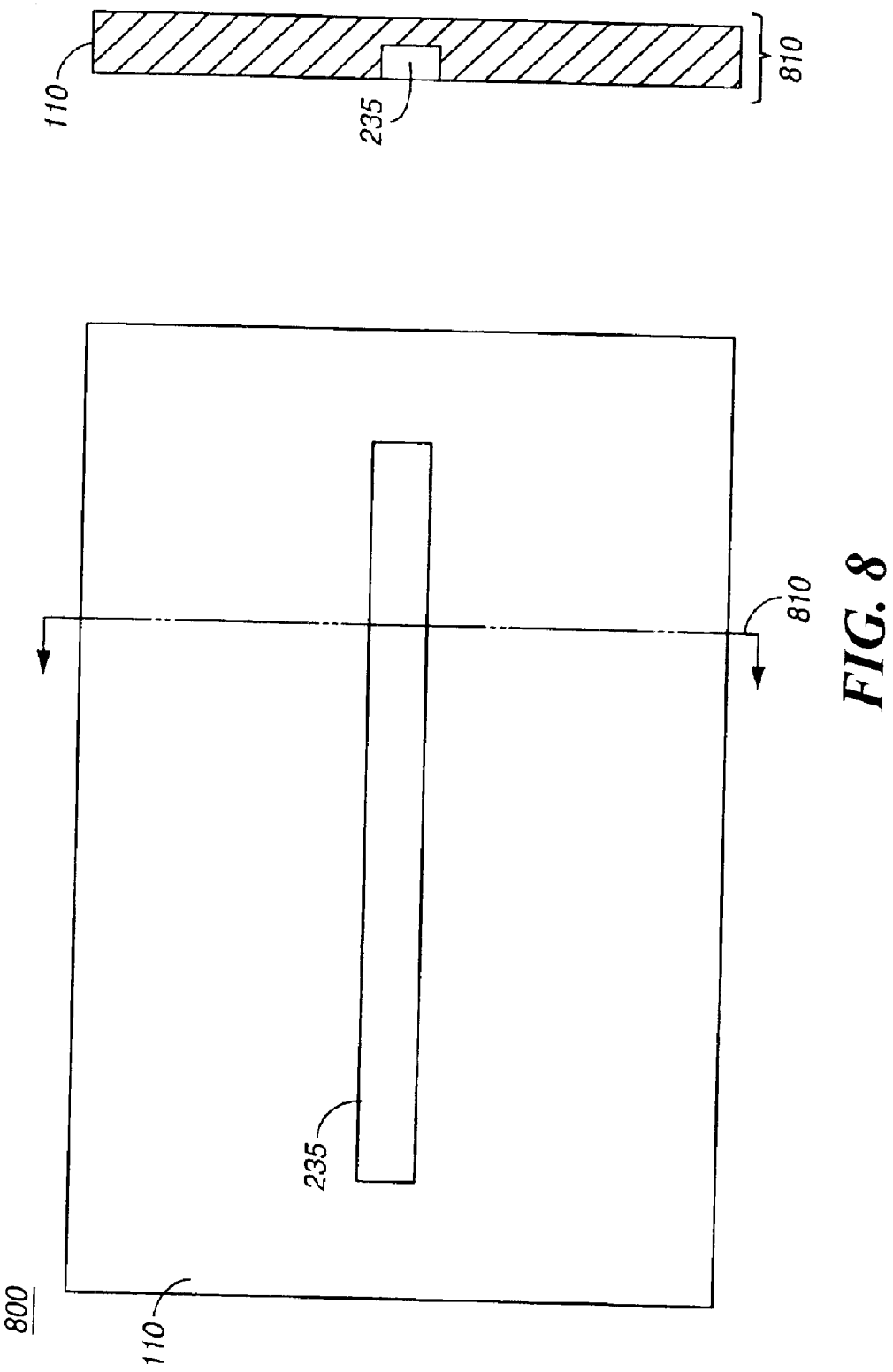
FIG. 8 is a top view of a cap layer of a slug assisted longitudinal liquid metal optical switch, according to certain embodiments of the present invention.

Referring now to FIG. 8 a top view 800 of cap layer 110 of slug assisted longitudinal liquid metal optical switch 105 is shown, according to certain embodiments of the present invention. The top view 800 illustrates an orientation of upper channel 235 relative to cap layer 110. In certain embodiments of the present invention, cap layer 110 is centered within cap layer 110 along a long axis and a short axis of channel 235.

Certain embodiments of the present invention use a motion of slug 220 caused by actuation of one or more of the plurality of piezoelectric elements 210 against said slug 220 to drive liquid metal 225 and slug 220 from a first two contacts of plurality of contacts 215 to a second two contacts of plurality of contacts 215, thereby causing one or more optical waveguides of the plurality of optical waveguides 150 to be blocked or unblocked and changing a state of the slug assisted longitudinal liquid metal optical switch 105. In certain embodiments of the present invention slug 220 is coupled to two contacts of plurality of contacts 215 while slug 220 is not in motion. The slug 220 assists in the blocking of the one or more optical waveguides 150. The slug assisted longitudinal liquid metal optical switch 105 latches by a wetting of the one or more contacts of the plurality of contacts 215 and a surface tension of the liquid metal 225 causing the liquid metal 225 to stay in a stable position. The slug 220 is wettable and so may be maintained in a stable position due to the surface tension of the liquid metal 225 and the coupling of the slug 220 to one or more of the plurality of contacts 215. In certain embodiments of the present invention, the plurality of optical waveguides 150 have faces that are not wettable by the liquid metal 225 in order to preserve an optical clarity of a signal path of the plurality of optical waveguides 150.

Plurality of vias 205 are oriented so that an increase in a pressure of inert gas in channel 230 is equalized as slug 220 and liquid metal 225 move from the first two contacts to the second two contacts. As an example, referring again to FIG. 2, as a piezoelectric element is actuated slug 220 is forced into motion. The motion of slug 220 and liquid metal 225 increases the pressure in a left side of the channel 230 of FIG. 2. The pressure is equalized with a right side of the channel 230 by plurality of vias 205 and the upper channel 235. In certain embodiments of the present invention, slug 220 and liquid metal 225 are present in channel 230 so that there is not a gap between a bottom of channel 230, slug 220, liquid metal 225 and a top of channel 230, thereby preventing a substantial amount inert gas from passing from the left side of channel 230 to the right side of channel 230 unless said inert gas passes through upper channel 235.

Liquid metal 225 is contained within the channel 230 and in certain embodiments of the present invention is coupled to the plurality of contacts 215. In certain embodiments of the present invention, slug 220 has a length operable to couple slug 220 to two contacts of plurality of contacts 215. Slug 220 is latched to two contacts of the plurality of contacts 215 by a surface tension between the plurality of contacts 215 and the slug 220. Latching is a stable configuration because the liquid metal 225 wets the plurality of contacts and is held in place by the surface tension. Slug 220 is wettable and in certain embodiments of the present invention liquid metal 225 and slug 220 may be moved within the channel 230 substantially more easily than only liquid metal 225.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A structure for an optical switch, comprising:
a channel housed within a solid material;
a plurality of contacts within the channel, wherein the plurality of contacts are coupled to the solid material;
a plurality of liquid metal globules, coupled to the plurality of contacts;
a slug, coupled to one or more of the plurality of liquid metal globules and coupled to one or more of the plurality of contacts;
a plurality of piezoelectric elements coupled to the channel and operable to be coupled to the slug; and
a plurality of optical waveguides coupled to the channel, said plurality of optical waveguides operable to be blocked or unblocked by the slug.

2. The structure of claim 1, wherein the slug is tapered at one or more ends.

3. The structure of claim 1, wherein the plurality of optical waveguides are further coupled to a corresponding plurality of encapsulants.

4. The structure of claim 1, wherein the slug is solid.

5. The structure of claim 1, wherein the slug is made of one or more of metal, ceramic, or plastic.

6. The structure of claim 1, wherein the slug is encapsulated within a liquid metal globule of the plurality of liquid metal globules.

7. The structure of claim 1, wherein the plurality of optical waveguides have faces that are not wettable.

8. The structure of claim 1, wherein the one or more liquid metal globules are composed of mercury.

9. The structure of claim 1, wherein the plurality of piezoelectric elements are further coupled to a corresponding plurality of actuating contacts, said plurality of actuating contacts operable to actuate the plurality of piezoelectric elements.

10. The structure of claim 1, wherein the channel is further coupled to one or more vias, said one or more vias operable to couple the channel to an upper channel.

11. The structure of claim 10, wherein the one or more vias and the upper channel are operable to equalize a pressure of an inert gas within the channel.

12. The structure of claim 10, wherein the one or more vias are located adjacent to the corresponding one or more piezoelectric elements.

13. The structure of claim 10, wherein the plurality of vias are oriented so that a via is located between a longitudinal end of the channel and a contact of the plurality of contacts.

14. The structure of claim 1, wherein the channel is further coupled to a gas that is inert and electrically non-conductive.

15. The structure of claim 14, wherein the gas substantially fills one or more locations within the channel that are not used by the slug, the plurality of contacts, the plurality of liquid metal globules, and the plurality of piezoelectric elements.

16. A structure for an optical switch, comprising:
a via layer, said via layer comprising one or more vias;
a piezoelectric layer coupled to the via layer, said piezoelectric layer comprising a channel coupled to the one or more vias, wherein the channel comprises and is farther coupled to a plurality of contacts, a wettable slug, a plurality of piezoelectric elements, and a plurality of liquid metal globules;
a wetting pad substrate layer coupled to the piezoelectric layer, said wetting pad substrate layer coupled to the plurality of contacts; and
a plurality of optical waveguides coupled to the piezoelectric layer.

17. The structure of claim 16, wherein the plurality of optical waveguides are coupled to the channel and are operable to be blocked or unblocked by a motion of the wettable slug.

18. The structure of claim 16, wherein the wettable slug, one or more of the plurality of liquid metal globules, and a contact of the plurality of contacts substantially fill the channel in a direction opposite to a direction of motion of the slug.

19. The structure of claim 16, wherein the piezoelectric layer further comprises an encapsulant operable to be coupled to the plurality of optical waveguides.

20. The structure of claim 16, wherein the slug is made of one or more of metal, ceramic, or plastic.

21. The structure of claim 16, wherein the slug is encapsulated within a liquid metal globule of the plurality of liquid metal globules.

22. The structure of claim 16, wherein the plurality of optical waveguides have faces that are not wettable.

23. The structure of claim 16, wherein the one or more liquid metal globules are composed of mercury.

24. The structure of claim 16, wherein the one or more vias are coupled to an upper channel, said upper channel operable to equalize a pressure of an inert gas within the channel.

25. The structure of claim 24, wherein the upper channel resides in a cap layer coupled to the via layer.

26. The structure of claim 16, wherein the one or more vias are oriented so that a via of the one or more vias is located between a longitudinal end of the channel and a contact of the plurality of contacts.

27. The structure of claim 16, wherein the channel is further coupled to a gas that is inert and electrically nonconductive.

28. The structure of claim 16, wherein the cap layer, via layer, piezoelectric layer, and wetting pad substrate layer may be composed of one or more of glass, ceramic, composite material and ceramic-coated material.

29. A method for switching of one or more optical signals using a liquid metal switch, comprising:

actuating one or more piezoelectric elements;

moving a slug housed within a channel by the actuation of the one or more piezoelectric elements;

the motion of the slug blocking or unblocking one or more optical waveguides.

30. The method of claim 29, wherein prior to moving the slug is coupled to one or more contacts of the channel, said coupling facilitated by a surface tension between a liquid metal coupled to the slug and the liquid metal coupled to the one or more contacts.

31. The method of claim 29, wherein a piezoelectric element of the one or more piezoelectric elements is actuated by applying an electric potential applied to a first side and a second opposite side of the piezoelectric element.

32. The method of claim 29, wherein a coupling of the slug to a contact is maintained by a surface tension between a liquid metal and the contact.

33. The method of claim 29, wherein the slug is coupled to a contact by the wettability of the slug and the presence of liquid metal on the slug.

34. The method of claim 29, wherein one or more vias coupled to the channel are equalizing a pressure of an inert gas within the channel.

35. The method of claim 34, wherein equalizing the pressure is further facilitated by a coupling of the one or more vias to an upper channel.

36. The method of claim 29, wherein prior to the motion of the slug the actuation of the piezoelectric element breaks a liquid metal connection between the slug and a first and second contact of the channel.

37. The method of claim 36, wherein after breaking the liquid metal connection, a second liquid metal connection and a slug coupling is established between the slug and a third and fourth contact.

* * * * *

UNITED STATES PATENT AND TRADEMARK OFFICE
CERTIFICATE OF CORRECTION

PATENT NO. : 6,946,775 B2  Page 1 of 1
DATED : September 20, 2005
INVENTOR(S) : Fong et al.

It is certified that error appears in the above-identified patent and that said Letters Patent is hereby corrected as shown below:

<u>Column 8,</u>
Line 51, delete "farther" and insert -- further --.

Signed and Sealed this

Twenty-fourth Day of January, 2006

JON W. DUDAS
*Director of the United States Patent and Trademark Office*